United States Patent [19]
Tanaka et al.

[11] 3,718,713
[45] Feb. 27, 1973

[54] THERMOPLASTIC POLYAMIDE POLYESTER URETHANE UREA RESIN

[75] Inventors: Atsushi Tanaka, Ibaraki-shi; Hachiro Goto, Takatsuki-shi, both of Japan

[73] Assignee: Teijin Limited, Osaka, Japan

[22] Filed: April 26, 1971

[21] Appl. No.: 137,657

[30] Foreign Application Priority Data

Apr. 28, 1972 Japan..........................45/36628

[52] U.S. Cl..............260/858, 117/161 KP, 161/190, 260/32.6, 260/75 NH, 260/77.5 AM, 260/857 PE
[51] Int. Cl.........................C08g 41/04, C08g 22/10
[58] Field of Search...260/75 NH, 77.5 AM, 77.5 SP, 260/857 PE, 858

[56] References Cited

UNITED STATES PATENTS 3,632,536   1/1972   Iwakura et al....................260/18 TN Primary Examiner—Donald E. Czaja
Assistant Examiner—H. S. Cockeram
Attorney—Sherman & Shalloway

[57] ABSTRACT

A thermoplastic polyamide urethane urea resin derived from (A) a liner polyhydroxyl terminated prepolymer free from ethylene terephthalate units, which has an average molecular weight of 400 to 4,000 and is liquid at 80° C., (B) a linear hydroxyl-terminated polyester prepolymer, which has a molecular weight of 400 to 3,000 and a melting point of 50° to 220° C. and in which 35 to 95 percent by weight of the molecular chain consists of ethylene terephthalate units, (C) a linear polyamide prepolymer having an average molecular weight of 400 to 4,000 and a melting point of 100° to 200° C., in which at least 80 percent of the both terminal groups are amino groups, and (D) an organic diisocyanate; the composition of the reaction components (A), (B), (C) and (D) being as follows:

i. (D)/((A) + (B) + (C)) (mole ratio) 1
ii. ((B) + (C))/(A) (weight ratio) = 0.5 – 2
iii. (C)/((B) + (C)) (weight ratio) = 0.06 – 0.85
iv. (C)/((A) + (B) + (C) + (D)) (weight %) = 3 – 55.

10 Claims, No Drawings

THERMOPLASTIC POLYAMIDE POLYESTER URETHANE UREA RESIN

This invention relates to a novel thermoplastic polyamide urethane urea resin having excellent resistances to water and drycleaning, which is suitable for bonding, coating, and laminating applications, especially suitable as sewing bonding materials in such forms as films, tapes, filaments, yarns, tows, knitted and woven fabrics, and non-woven fabrics; and to a process for its production.

It is an object of the present invention to provide a novel thermoplastic polymer which has excellent properties as a bonding agent which is capable of melt-bonding fibers or assemblies of fibers within short periods of time, or as a laminating or coating agent for these fibers; and also a process for producing such a polymer.

The bonding, laminating, or coating agents for fibers or assemblies of fibers are generally required to have softness, water resistance, and resistance to drycleaning. When fibers or fiber assemblies are heat melt-bonded by using a thermoplastic polyurethane, the softness is good, but generally high melting temperatures are required. There is also the defect of poor resistance to drycleaning.

A thermoplastic polyurethane obtained by the reaction of a polyhydroxyl prepolymer with a polyester prepolymer and a diisocyanate exhibits affinity especially for polyester fiber assemblies, and has good resistance to water. However, it has poor resistance to drycleaning.

Polyamide type bonding agents, when used for bonding fiber assemblies, give good drycleaning resistance in general, but the bonded fiber assemblies have very hard feel and poor resistance to water.

As a result of research and development works for providing thermoplastic resins free from such defects, we have now found that a novel thermoplastic polyamide urethane urea resin derived from a specific combination of reaction components, which has not been proposed heretofore, can be provided, and this resin has excellent improved properties free from the above-mentioned defects.

This novel resin is a linear quaternary copolymer which can be readily shaped by the heat melting method or by using a solvent, shows affinity not only for polyester fibers but also for blends of polyester fibers and other fibers, and has excellent properties such as softness, resistance to water, and resistance to drycleaning as bonding, laminating, and coating agents.

The novel resin can be produced by reacting the following four components (A) to (D) under the conditions $(i)$ to $(iv)$:

A. A linear polyhydroxyl prepolymer containing a hydroxyl group at both terminals but being free from ethylene terephthalate chains, which has an average molecular weight or 400 to 4,000 and is liquid at 80° C.;

B. A linear polyester prepolymer having a hydroxyl group at both terminals which has an average molecular weight of 400 to 3,000 and a melting point of 50° to 220° C., and in which 35 to 95 percent by weight of the molecular chain is composed of ethylene terephthalate units;

C. A linear polyamide prepolymer which has an average molecular weight of 400 to 4,000 and a melting point of 100° to 200° C., and in which at least 80% of both end groups consist of amino groups; and D. an organic diisocyanate $i.$ (D)/(A) + (B) + (C) (molar ratio) < 1
$(ii)$ (B) + (C)/(A) (weight ratio) = 0.5 − 2
$(iii)$ (C)/(B) + (C) (weight ratio) = 0.06 − 0.85
$(iv)$ (C)/(A) + (B) + (C) + (D) (weight %) = 3 − 55

It is known to produce a thermoplastic polymer by reacting a compound having an active hydrogen atom with a polyisocyanate compound, but a polymer derived from the reaction components described above has never been proposed before.

Examples of the linear polyhydroxyl prepolymer (A) above include polyalkylene ether glycols obtained by polymerizing ethylene oxide, trimethylene oxide, tetrahydrofuran or substituted compounds thereof, such as 1,2-propylene oxide; polyether glycols obtained by reacting aliphatic dicarboxylic acids such as succinic acid, glutaric acid, adipic acid, suberic acid, azelaic acid, or sebacic acid, or lower alcohol esters thereof (for instance, dimethyl esters), with glycols, for example, aliphatic glycols selected from ethylene glycol, 1,2-propylene glycol, trimethylene glycol, tetramethylene glycol, hexamethylene glycol, diethylene glycol, triethylene glycol, and neopentyl glycol in excess moles; polyester glycols partly containing phthalic acid, isophthalic acid, or xylene glycol; and mixtures of these. The preferred polyhydroxyl compounds consist mainly of aliphatic components, which have an average molecular weight of 400 to 4,000, preferably 800 to 3,000 and a liquid at 80° C., preferably liquid at 60° C.

The preferred linear polyester prepolymers (B) are those in which 50 to 95 percent by weight of the molecular chain consists of ethylene terephthalate units.

Examples of such prepolymers (B) include prepolymers derived from terephthalic acid and/or dimethyl terephthalate and ethylene glycol. Other preferred polyester prepolymers are those consisting mainly of aromatic components, which are obtained by condensing acid components such as dicarboxylic acids, for example, isophthalic acid, 2-methylterephthalic acid, 4-methylisophthalic acid, phthalic acid, para-(beta-hydroxyethoxy)benzoic acid, 4,4'-diphenyl carboxylic acid, succinic acid, glutaric acid, adipic acid, suberic acid, sebacic acid, azelaic acid, fumaric acid, maleic acid, and lower alcohol esters thereof, with glycol components such as propylene glycol, tetramethylene glycol, hexamethylene glycol, neopentyl glycol, or diethylene glycol of excess moles. The prepolymers have a melting point of at least 50° C. but below 220° C., and an average molecular weight of 400 to 3,000. Preferably, the prepolymers have a melting point of 50° C. to 200° C., and an average molecular weight of 1,000 to 2,500.

Examples of the linear polyamide prepolymers (C) are those obtained by copolymerizing diamines with dibasic acids, derivatives thereof, omega-amino acids, or cyclic amides. The diamines are added in an excess mole over the carboxyl group so that most of the end groups of the prepolymer, preferably at least 80 percent, will be amino groups. The diamines include, for example, aliphatic amines such as ethylene diamine, trimethylene diamine, tetramethylene diamine, pentamethylene diamine, hexamethylene diamine, heptamethylene diamine, octamethylene diamine, nonamethylene diamine, or decamethylene diamine, derivatives thereof such as 3-methoxyhexamethylene diamine; cyclic diamines such as 1,3-cyclohexane diamine, 1,4-cyclohexane diamine, 1,3-hexahydroxy-lylene diamine, and metaxylene diamine; and diamines obtained by substituting an ether linkage for the methylene group of said aliphatic and cyclic diamines.

Examples of the dibasic acids that can be used include aliphatic dicarboxylic acids such as oxalic acid, succinic acid, glutaric acid, adipic acid, pimelic acid, suberic acid, azelaic acid, or sebacic acid, and lower alcohol esters thereof; and hereto atom-containing dicarboxylic acids or cyclic dicarboxylic acids such as terephthalic acid, methylterephthalic acid, hexahydroterephthalic acid, isophthalic acid, methylisophthalic acid, paraxylylenedicarboxylic acid, or isocinchomeronic acid.

Examples of the omega-aminoacids used in the invention are epsilon-aminocaproic acid, omega-aminoheptanoic acid, omega-amino-nonanoic acid, and omega-aminoundecanoic acid, and lower alcohol esters thereof.

The cyclic amides include, for example, epsilon-caprolactam or laurolactam.

The polyamide prepolymer (C) used in the invention may also be one obtained by partial alkylation of the nitrogen atom of the amide linkage or copolymerizing an N-alkyl polyamide. Preferably, the polyamide prepolymer (C) has a melting point of 130° to 180° C., and an average molecular weight of 800 to 3,500, while generally it has a melting point of 100° C. to 200° C. and an average molecular weight of 400 to 4,000. Preferably, there are used binary to quaternary copolyamide prepolymers which are derived from $C_6$—$C_{12}$ lactams and/or $C_6$—$C_{12}$ omega-amino acids and/or $C_6$—$C_{12}$ dicarboxylic acids, and $C_6$—$C_{12}$ diamines, and which have an average molecular weight of 800 to 3,500 and a melting point of 120° to 170° C., and in which at least 80% of both end groups consists of amino groups.

The organic diisocyanates (D) that are used in the present invention are aliphatic, alicyclic, and aromatic diisocyanates, and can be expressed by the following formula

OCNRNCO in which R is a residue selected from the group consisting of aliphatic, alicyclic, and aromatic residues. These are used either alone or in combination.

Diisocyanates of the above formula wherein R is a $C_6$—$C_{10}$ aliphatic residue are preferred. Examples of such siisocyanates include hexamethylene diisocyanate, dimethyl hexamethylene diisocyanate, trimethyl hexamethylene diisocyanate, metaxylylene diisocyanate, and paraxylylene diisocyanate.

Of the diisocyanates having an aromatic residue, those in which R is an aromatic residue having six to 16 carbon atoms that may be substituted by halogen, lower alkyl, or lower alkoxy are preferred. Examples of such aromatic diisocyanates are 2,4-tolylene diisocyanate, a mixture of 2,4-tolylene (80% by weight) and 2,6-tolylene diisocyanate (20% by weight), tetramethyl phenylene diisocyanate, diphenylmethane-4,4'-diisocyanate, metaphenylene diisocyanate, paraphenylene diisocyanate, naphthalene-1,5-diisocyanate, and diphenyl-4,4'-diisocyanate.

As the diisocyanates in which R is an alicyclic residue, those in which the alicyclic residue has six to 13 carbon atoms are preferred. The Examples include isophorone diisocyanate and dicyclohexylmethane diisocyanate.

The typical method of producing the thermoplastic polyamide urethane urea resin comprising the prepolymers (A), (B), and (C), and the organic diisocyanate will be described specifically below.

Various methods can be used to effect this reaction. It is possible to use a method in which (C) and (D) are mixed and reacted, and then (A) and (B) are mixed and reacted. But as the reaction mixture tends to be gelled at the time of mixing the components (C) and (D), it is preferable to use other methods. For instance, the following methods can be cited.

1. (A), (B) and (C) are mixed, and then (D) is mixed with the mixture.
2. (A) and (B) are mixed; (D) is then mixed with the mixture; and then (C) is mixed with the mixture.
3. (A) and (D) are mixed, and then the resulting mixture is mixed with a mixture of (B) and (C).
4. (A) and (D) are mixed; then the resulting mixture is mixed with (B); and then (C) is mixed with the resulting mixture.

It is also possible to use a method in which one or more of the components (A), (B), (C) and (D) are reacted in portions. For example, in method (4), (A) is first mixed and reacted with (D), and then the resulting mixture is mixed and reacted with a portion of (B), and finally, a mixture of the remainder of (B) and (C) is mixed and reacted with the resulting mixture. In any of these methods, the molar ratio of (D) to the sum of (A), (B) and (C) should be less than 1, preferably 0.80 to 0.98.

According to method (1), the three prepolymers (A), (B) and (C) are mixed and heated, and the mixture is dehydrated and dried at a temperature of 80° to 120° C. and a pressure of 2 mm Hg to 10 mm Hg; thereafter, with vigorous stirring in an atmosphere of nitrogen, the organic diisocyanate (D) is added and reacted with the dried mixture. At this time, the molar ratio of (D) to the sum of (A), (B) and (C) should be less than 1, preferably 0.80 to 0.98.

In method (3) in which an excess molar amount of the organic diisocyanate (D) is reacted with the polyhydroxyl compound (A) to form a linear polyurethane prepolymer (A') having an isocyanate group at both ends, first the polyhydroxyl compound (A) is heated, and dehydrated and dried at a temperature of 80° to 120° C. and a pressure of 2 mm Hg to 10 mm Hg, and then excess mole of the organic diisocyanate (D), preferably 1.5 – 2.0 moles per mole of the dihydroxyl compound (A), is added. The resulting polyurethane prepolymer (A') having an isocyanate group at both ends is then mixed and reacted with the prepolymers (B) and (C) in an atmosphere of nitrogen. At this time, the isocyanate equivalent of the polyurethane prepolymer (A') should be less than the equivalent of the prepolymers (B) and (C).

In any of the methods (1) to (4), the polyamide prepolymer (C) should be those in which most, preferably at least 80 percent, of both end groups are amino groups, the remaining carboxyl groups being less than 20 percent. When the carboxyl group content is above 20 percent, side reactions tend to occur during the reaction of the components (A) to (D). Especially when it is desired to obtain a polymer of high degree of polymerization containing a sufficient amount of the prepolymer (C), it is difficult to attain thermoplastic properties.

The melting points and molecular weights of the polyhydroxyl compound (A), the polyester prepolymer (B), and polyamide prepolymer (C) are chosen from the ranges specified above. The weight ratio of the sum of (B) and (C) to (A) should preferably be 0.5 to 2.0, more preferably 0.8 to 1.7. The weight ratio of (C) to the sum of (B) and (C) is preferably 0.06 to 0.85, more preferably 0.10 to 0.76. The weight of the polyamide component in the polymer obtained by the reaction of the prepolymers (A), (B) and (C) and the organic diisocyanate (D) is preferably 3 – 55 percent, more preferably 5 to 45 percent.

When the weight ratio of the sum of (B) and (C) to (A) is less than 0.5, the resulting polymer has small cohesive force, large stickiness, and poor elasticity. Where this ratio is more than 2, the resulting polymer has an increased hardness, and the elastic properties are impaired.

When the weight ratio of (C) to the sum of (B) and (C) is smaller than 0.06, the resulting polymer has poor resistance to drycleaning, and when this ratio exceeds 0.85, the polymer obtained has a reduced affinity for shaped articles of polyethylene terephthalate, and generally has a high softening point.

If the weight of the polyamide component in the resulting polymer is less than 3 percent, the polymer has a poor resistance to drycleaning, and where the weight is larger than 55 percent, the softening point of the polymer abruptly rises, and the elastic properties are impaired.

According to the desired properties of the thermoplastic polyamide urethane urea resin of the invention, the weight of the linear polyamide prepolymer in the resulting resin can be varied within the above specified range.

For example, when the weight of the polyamide component in the resulting polymer is 3 to 10 percent, the affinity for blends of polyethylene terephthalate and cellulose fibers is very much improved with some decrease of drycleaning resistance. Where the weight of the polyamide component is 10 to 40 percent, both the resistance to drycleaning and the affinity for polyethylene terephthalate articles are superior. If the weight of the polyamide component is 40 to 50 percent, the affinity for polyethylene terephthalate articles is improved to a slight degree, but the resulting polymer has good resistance to drycleaning, and good affinity for polyamide shaped articles.

In this way, the weight of the polyamide component in the polyamide urethane urea resin acts characteristically on the properties of the resulting resin.

The reaction of the prepolymers (A), (B) and (C) and the organic diisocyanate (D) can be performed in the molten state. But the reaction of them in an inert solvent such as dimethyl formamide or dimethyl acetamide is advantageous because it can be performed uniformly at lower temperatures.

The thermoplastic polyamide urethane urea resin so produced can be used without a curing treatment. The resin can be processed by injection molding, extrusion, and calendering, and used as bonding and coating agents as already mentioned. Especially, the thermoplastic polymer of the invention exhibits good affinity for polyester shaped articles, for instance, films, fibers, blends of polyester fibers and other fibers, and union cloth of polyester fibers and other fibers, and is suitable as bonding agents, coating agents, and laminating agents for these articles.

According to the end uses, the thermoplastic polymer of the invention may contain heat stabilizers, light stabilizers, antioxidants, and plasticizers.

The average molecular weights and melting points were measured by the following methods.

Linear polyhydroxy prepolymer (A)

1. Measurement of OH Value (JIS K-3342-1961)

About one gram of the specimen is placed in a flask, and 5 ml. of a reagent (100 ml. of a mixture consisting of 20 g of acetic anhydride with pyridine) is added. The flask is immersed in a glycerine bath, and maintained at 95° to 100° C. for one hour. It is then cooled down to room temperature, and shaken with the addition of 1 ml. of distilled water. The glask is further immersed in the glycerine bath for 10 minutes, heated at 95° to 100° C., and then cooled down to room temperature. Using a phenolphthalein as an indicator, the titration is made with a ½ N potassium hydroxide solution (one liter of a solution of 28.05 g of potassium hydroxide in a 9:1 mixture of benzyl alcohol and methyl alcohol).

Separately, a blank test is carried out, and the hydroxyl value of the specimen is calculated by the following equation.

$$HV = (B-C) \times 28.05/A + NV$$

wherein HV : hydroxyl value;
A : weight in grams of the specimen;
B : the amount in milliters of ½ N potassium hydroxide solution used in the blank test;
C : the amount in milliters of ½ N potassium hydroxide solution used in the first-mentioned test;
NV : neutralization value.

2. Measurement of the carboxyl value

About 1 g of the specimen is placed in a flask, and 50 ml. of benzyl alcohol is added. The mixture is heated to 70° C. to form a solution. The solution is cooled down to room temperature, and titrated with a 1/100 N potassium hydroxide solution (one liter of a solution of 0.561 g of potassium hydroxide in a 9:1 mixture of benzyl alcohol and methyl alcohol.) using phenolphthalein as an indicator.

Separately, a blank test is performed, and the carboxyl value is calculated by the following equation.

$$AV = (C-B)/A \times 0.561$$

where AV : carboxyl value;
A : the weight in grams of the specimen;

C : the amount in milliliters of the 1/100 N potassium hydroxide solution in the first-described test;

B : the amount in milliliters of the 1/100 N potassium hydroxide solution.

The molecular weight (MW) of the linear polyhydroxyl prepolymer (A) is calculated by the following equation using the hydroxyl and carboxyl values measured above.

$$MW = 56.11/AV + HV \times 2000$$

Linear polyester prepolymer (B)

The hydroxyl and carboxyl values are determined by the method described in Macromol. Chem. 26, 234 (1958), and the molecular weight is computed by using the same equation as used in the determination of the molecular weight of the linear polyhydroxyl prepolymer (A).

Linear polyamide prepolymer (C)

(1) Determination of $NH_2$ concentration (equivalents/$10^4$g of polymer)

About 1 g of the specimen is placed in a flask, and 25 g of phenol is added. The mixture is heated to 70° C. to form a solution. The solution is diluted with 12.5 g of ethyl alcohol and 12.5 g of distilled water. The diluted solution is cooled down to room temperature. Then, ½ N hydrochloric acid is added dropwise to titrate the solution conductometrically. The $NH_2$ concentration is determined by the following equation.

$$NH_2 \text{ concentration} = 0.5\ C/A \times 10$$

wherein A : the weight of the specimen in grams;

C : the amount in milliliters of ½ hydrochloric acid which has been added dropwise.

2. Determination of COOH concentration (equivalents/$10^4$g of polymer)

About one gram of the specimen is placed in a flask, and 50 ml. of benzyl alcohol is added. The mixture is heated to 70° C. to form a solution. The solution is then cooled down to room temperature, and titrated with 1/100 N potassium hydroxide solution (one liter of a solution of 0.561 g of potassium hydroxide in a 9:1 mixture of benzyl-alcohol and methyl alcohol), using phenolphthalein as an indicator.

Separately, a blank test is performed, and the COOH concentration is computed by the following equation.

$$\text{COOH concentration} = (C - B) \times 0.01/A \times 10$$

wherein A : the weight in grams of the specimen;

B : the amount of 1/100 N potassium hydroxide solution in the blank test; and

C : the amount of 1/100 N potassium hydroxide solution in the first-mentioned test.

The molecular weight (MW) of the linear polyamide prepolymer (C) is computed by the following equation using the $NH_2$ and COOH concentrations obtained above.

$$MW = 2/[NH_2] + [COOH] \times 10^4$$

wherein MW : the molecular weight of the linear polyamide prepolymer;

[$NH_2$] : the concentration of $NH_2$ in equivalents/$10^4$ of polymer;

[COOH] : the concentration of COOH in equivalents/$10^4$ of polymer.

Melting point

The melting points of these prepolymers are determined by raising the measuring temperature at a rate of 3° C/min. using a micro melting point apparatus.

The invention will be specifically illustrated by the following Examples.

The bonding described in the Examples was performed by heat bonding for 15 seconds at a pressure of 140 g/cm² using a T.S.S. scorch tester. The measurement of the strength, and elongation of the film and the measurement of the peel strength were performed under the following conditions.

Specimen length . . . . . 20 mm

Pulling speed . . . . . . . 40 mm/min.

Example 1

Polyethylene adipate (A) having an average molecular weight of 1016 (50.8 g) was heated to 100° C., and dehydrated and dried for 30 minutes at a reduced pressure of 3 mm Hg. The dried product was then maintained at 100° C. in an atmosphere of nitrogen. Xylylene diisocyanate (D) (meta/para=80/20) (18.8 g) was added and with stirring, reacted with the prepolymer (A) at 100° C. for 60 minutes. The resulting polymer was a polyurethane prepolymer derived from the polyethylene adipate (A) and the xylylene diisocyanate (D).

Separately, 51 g of a polyester prepolymer (B) having an average molecular weight of 1,700 composed of terephthalic acid (70)/isophthalic acid (25)/adipic acid (5)/ethylene glycol and 30 g of a polyamide prepolymer (C) having an average molecular weight of 1,250 composed of epsilon-aminocaproic acid (30)/nylon 66 salt (35)/nylon 6,10 salt (35) were dissolved in 100 g of anhydrous dimethyl acetamide by heating in an atmosphere of nitrogen. As a catalyst, 0.2 g of dibutyl tin dilaurate was added. With vigorous stirring at 130° C., the polyurethane prepolymer obtained above was added, and reacted for 60 minutes at 130° – 140° C. In this Example, the weight ratio of the components (B) and (C) to the component (A) was 1.59, and the polyamide component accounted for 20 percent by weight of the resulting polyamide urethane urea resin.

Films were prepared from a solution of the resulting resin in dimethyl acetamide, and the strength and elongation of the films were measured. The film was interposed between polyethylene terephthalate fabrics woven from a blend of polyethylene terephthalate fibers and cotton, and heat bonded at 150° C. for 15 minutes. The peel strength of the film was measured. Furthermore, the heat bonded fabric was immersed for 2 hours in water or perchloroethylene, and the peel strength was measured in a wet condition. The results are shown below.

| | |
|---|---:|
| Thickness of the film | 150 microns |
| Bread strength of the film | 4.8 kg/cm |
| Break elongation of the film | 600 % |
| Peel strength of polyethylene/terephthalate (65)/cotton (35) fabrics | 4.0 kg/cm |
| Peel strength of polyethylene terephthalate knits | 3.5 kg/cm |
| Peel strength of polyethylene terephthalate knits immersed in water for 2 hours | 3.0 kg/cm |
| Peel strength of polyethylene terephthalate knits immersed in perchloroethylene for 2 hours | 2.0 kg/cm |

The polyester prepolymer (B) having the composition terephthalic acid (70)/isophthalic acid (25)/adipic acid (5)/ethylene glycol was prepared as follows:

Dimethyl terephthalate (1358 g), 485 g of dimethyl isophthalate, 73 g of adipic acid, 1550 g of ethylene glycol, and 2 g of cerium acetate as a catalyst were mixed with each other and heated in an atmosphere of nitrogen. Soon, a homogeneous solution was formed, and methanol began to distill off at about 150° C. The temperature was raised to 210° C., and after about 600 g of methanol containing some water distilled off, the pressure was gradually reduced to distill off ethylene glycol. The reaction was stopped when 858 g of ethylene glycol distilled off. The polyester prepolymer obtained had a melting point of 172° C., an OH value of 65.3, a COOH value of 0.6, and a molecular weight of 1,700.

The linear polyamide prepolymer (C) having the composition epsilon-aminocaproic acid (30)/nylon 6,6 (35)/nylon 6,10 (35) was prepared in the following way.

Ninety grams of epsilon-aminocaproic acid, 105 g of nylon 6,6 salt, 105 g of nylon 6,10 salt, 41 g of hexamethylene diamine, and 150 g of ion exchange water were mixed and heated in an atmosphere of nitrogen. At 90° C., a homogeneous solution resulted, and at about 110° C., the water began to distill off. The temperature was gradually raised, and in 60 minutes from the beginning of distill off of water, the temperature rose to 195° C. The reaction was performed at this temperature for 60 minutes. When the distill off of water stopped, the pressure was gradually reduced, and the reaction was performed for 30 minutes at 5 mm Hg. The resulting polyamide prepolymer had a melting point of 144° C., an $NH_2$ concentration of 15.10 equivalents per $10^4$ g of polymer, a COOH concentration of 0.90 equivalent per $10^4$ g of polymer, and a molecular weight of 1,250. Resins (Comparative Examples 1 to 7) were prepared in the same way as mentioned in Example 1 except that the proportions of the reaction components and the conditions (i) to (iv) were changed as indicated in the following table. The physical properties of these resins are shown in the table along with the results of Example 1.

| | Ex. 1 | Comparative Example | | | | | | |
|---|---|---|---|---|---|---|---|---|
| | | 1 | 2 | 3 | 4 | 5 | 6 | 7 |
| (i) (D)/(A)+(B)+(C) (mole ratio). | 0.96 | 1.1 | 0.96 | 0.96 | 0.96 | 0.96 | 0.96 | 0.96 |
| (ii) (B)+(C)/(A) (wt. ratio). | 1.59 | 1.59 | 2.3 | 0.4 | 1.3 | 1.3 | 1.8 | 1.4 |
| (ii) (C)/(B)+(C) (wt. ratio). | 0.37 | 0.37 | 0.37 | 0.25 | 0.90 | 0.05 | 0.95 | 0.04 |
| (iv) (C)/(A)+(B)+(C)+(D) (weight percent). | 20 | 20 | 13.2 | 13 | 50 | 2.5 | 57 | 2.5 |
| Break strength of the film (kg./cm.). | 4.8 | (¹) | 4.9 | 0.8 | 4.0 | 2.5 | 4.0 | 2.5 |
| Break elongation of the film (percent). | 600 | (¹) | 100 | 600 | 200 | 800 | 200 | 800 |
| Melt-bonding temperature (° C.) | 150 | (¹) | 190 | 120 | 200 | 140 | 210 | 140 |
| Peel strength (kg./cm.) of fabrics of blends of cotton (35)/polyethylterephthalate (65). | 4.0 | (¹) | 1.5 | 1.0 | 1.5 | 4.2 | 1.5 | 4.2 |
| Peel strength (kg./cm.) of polyethylene terephthalate knits with each other. | 3.5 | (¹) | 1.4 | 1.0 | 1.0 | 3.0 | 1.0 | 3.0 |
| Peel strength (kg./cm.) of above knits after 2-hour immersion in water. | 3.0 | (¹) | 1.2 | 1.0 | 1.0 | 2.9 | 1.0 | 2.9 |
| Peel strength (kg./cm.) of above knits after 2-hour immersion in perchloroethylene. | 2.0 | (¹) | 1.0 | 0.4 | 0.9 | 0.5 | 0.9 | 0.5 |

¹ Gellation occurred; film could not be formed.

Example 2

50.8 Grams of the polyethylene adipate (A) having an average molecular weight of 1,016, 51 g of the polyester prepolymer (B) having an average molecular weight of 1,700, and 30 g of the polyamide prepolymer (C) having an average molecular weight of 1,250 were mixed, and heated to 100° C., followed by dehydration and drying for 30 minutes at 3 mm Hg. (All these prepolymers were the same as used in Example 1.) Anhydrous dimethyl acetamide (150 g) was added and the resulting mixture was dissolved in it by heating in an atmosphere of nitrogen. After adding 0.2 g of dibutyl tin dilaurate as a catalyst, the mixture was vigorously stirred at a temperature of 130° C., and concurrently, 8.8 g of xylylene diisocyanate (meta/para=80/20) was added dropwise. The reaction was performed for 60 minutes at 130° to 140° C.

In this Example, the weight ratio of the three prepolymers (A), (B) and (C) used, and the methods of their preparation were charged.

A dimethyl acetamide solution of the resulting polyamide urethane urea resin was formed into films, and the strength and elongation of the films were measured. Furthermore, the film was interposed between knits, and heat bonded at 155° C, for 15 seconds. The peel strength of the film was measured. The results were as follows:

| | |
|---|---|
| Thickness of the film | 155 microns |
| Break strength of the film | 4.3 kg/cm |
| Break elongation of the film | 620 % |
| Peel strength of polyethylene terephthalate knits bonded to each other | 3.3 kg/cm |
| Peel strength of the above knits after 2-hour immersion in water | 2.9 kg/cm |
| Peel strength of the above knits after 2-hour immersion in perchloroethylene | 1.7 kg/cm |

Example 3

Polytetramethylene glycol (A) (68.5 g) having an average molecular weight of 1,370 was heated at 100° C. in an atmosphere of nitrogen, and dehydrated and dried for 30 minutes at 3 mm Hg. At the same temperature, 25 g of 4,4'-diphenylmethane diisocyanate (D) was added, and the reaction was performed with stirring at 150° C. for 60 minutes to form a polyurethane prepolymer.

Separately, 66 g of the polyester prepolymer (B) (OH value 55.5, carboxyl value 0.5, melting point 174° C.) having an average molecular weight of 2000 and composed of terephthalic acid (70)/isophthalic acid (30)/ethylene glycol, which was prepared in the same way as set forth in Example 1, and 25.5 g of a polyamide prepolymer (C) having an average molecular weight of 1,250 same as that used in Example 1 were dissolved in 120 g of anhydrous dimethyl acetamide by heating in an atmosphere of nitrogen. After adding 0.2 g of dibutyl tin dilaurate as a catalyst, the polyurethane prepolymer prepared above was added with vigorous stirring at 130° C., and the reaction was performed for 60 minutes at 130° to 140° C. In this Example, the weight ratio of (B) + (C)/(A) was adjusted to 1.33, and the weight of the polyamide component in the polyamide urethane urea resin was 14 percent.

Films were prepared from a solution of the resulting polyamide urethane urea resin in dimethylacetamide, land the strength and elongation of the films were measured. The films were interposed between knits in the same way as set forth in Example 1, and heat bonded for 15 seconds at 150° C. The peel strength was then measured. The results were as follows:

| | |
|---|---|
| Thickness of the film | 145 microns |
| Break strength of the film | 4.3 kg/cm |
| Break elongation of the film | 750 % |
| Peel strength of polyethylene terephthalate knits bonded to each other | 3.5 kg/cm |
| Peel strength of the above knits after 2-hour immersion in water | 2.8 kg/cm |
| Peel strength of the above knits after 2-hour immersion in perchloroethylene | 1.6 kg/cm |

Example 4

Polyethylene propylene adipate (EG/PG=70/30) (A) (82.5 g) having an average molecular weight of 1,650 was heated to 100° C. in an atmosphere of nitrogen, and dehydrated and dried for 30 minutes at a reduced pressure of 3 mm Hg. Then, 18 g of xylylene diisocyanate (meta/para=80/20) (D) was added, and with stirring in an atmosphere of nitrogen, the reaction was performed for 60 minutes at 100° C. to form a polyurethane pre-polymer.

Separately, 57.8 g of a polyester prepolymer (B) (OH value 65.5, COOH value 0.4, melting point 170°0 C.) having an average molecular weight of 1,700, which was prepared by the method described in Example 1, and 29.6 g of a polyamide prepolymer (C) ($NH_2$ concentration 9.91 equivalents/$10^4$g of polymer, COOH concentration 0.92 equivalent/$10^4$g of polymer, melting point 145° C.) having an average molecular weight of 1.850 which was prepared from epsilon-aminocaproic acid (30)/nylon 6,6 (35)/nylon 6,10 (35) by the method described in Example 1 were dissolved in 125 g of anhydrous dimethyl acetamide by heating in an atmosphere of nitrogen. After adding 0.2 g of dibutyl tin dilaurate as a catalyst, the mixture was vigorously stirred at 130° C., and concurrently the polyurethane prepolymer prepared above was added. The reaction was carried out at 130° to 140° C. for 60 minutes. In this Example, the (B)+(C)/(A) weight ratio was 1.06, and the weight of the polyamide component in the polyamide urethane urea resin was 16 percent.

Films were prepared from a solution of the resulting polyamide urethane urea resin in dimethyl acetamide, and the strength and elongation of the films were measured. The film was interposed between polyethylene terephthalate knits, and heat bonded at 145° C. for 15 seconds. The peel strength was measured. The results were as follows:

| | |
|---|---|
| Thickness of the film | 150 microns |
| Break strength of the film | 4.0 kg/cm |
| Break elongation of the film | 1,200 % |
| Peel strength of polyethylene terephthalate knits bonded to each other | 2.8 kg/cm |
| Peel strength of the above knits after 2-hour immersion in water | 2.6 kg/cm |
| Peel strength of the above knits after 2-hour immersion in perchloroethylene | 1.6 kg/cm |

Example 5

Polyethylene adipate (A) (85.6 g) having an average molecular weight of 1,711 was heated to 100° C. in an atmosphere of nitrogen, and dehydrated and dried for 30 minutes at a reduced pressure of 3 mm Hg. Thereafter, 18 g of xylylene diisocyanate (D) (meta/para=80/20) was added, and the reaction was performed at 100° C. for 60 minutes in an atmosphere of nitrogen with stirring. A polyurethane prepolymer was obtained.

Separately, 58.5 g of a polyester prepolymer (B) (OH value 74.3, COOH value 0.4, melting point 170° C.) having an average molecular weight of 1,590 and consisting of terephthalic acid (70)/isophthalic acid (30)/ethylene glycol (prepared by the method described in Example 1) and 28.8 g of a polyamide prepolymer (C) having an average molecular weight of 2,617 and derived from epsilon-caprolactam, adipic acid, sebacic acid, and hexamethylene diamine (prepared by the method to be described) were dissolved in 127 g of anhydrous dimethyl acetamide by heating in an atmosphere of nitrogen. Thereafter, 0.2 g of dibutyl tin dilaurate was added, and then the above polyurethane prepolymer was added also. The reaction was performed for 40 minutes at 130° to 140° C. In this Example, the weight ratio (B)+(C)/(A) was 1.02, and the weight of the polyamide component in the resulting polyamide urethane urea resin was 15 percent.

In the same way as in the previous Example, films were prepared from a solution of polyamide urethane urea resin, and the strength and elongation of the films were measured. The film was interposed between polyethylene terephthalate fabrics, and heat bonded for 15 seconds at 140° C. The peel strength was measured. The results were as follows:

| | |
|---|---|
| Thickness of the film | 155 microns |
| Break strength of the film | 3.9 kg/cm |
| Break elongation of the film | 1,250 % |
| Peel strength of fabrics of blend of polyethylene terephthalate (65)/cotton(35) | 4.0 kg/cm |
| Peel strength of polyethylene terephthalate knits bonded to each other | 2.8 kg/cm |
| Peel strength of the above knits after 2-hour immersion in water | 2.6 kg/cm |
| Peel strength cf the above knits after 2-hour immersion in perchloroethylene | 1.5 kg/cm |

The polyamide prepolymer used in the present Example was prepared in the following manner.

155 Grams of epsilon-caprolactam, 117 g of adipic acid, 133 g of sebacic acid, 210 g of hexamethylene diamine, and 300 g of ion exchange water were mixed and heated in an atmosphere of nitrogen. When the temperature reached about 90° C., a homogeneous solution resulted. At this time, 0.01 of $MnCl_2 \cdot 4H_2O$ and 0.008 g of $CuCl_2 \cdot 2H_2O$ were added. At about 110° C., water began to distill off. The temperature was continuously raised, and in about 60 minutes, it rose to 195° C. The reaction was continued at this temperature for 120 minutes. The pressure was gradually reduced, and the reaction was performed for 30 minutes at 5 mm Hg. Then, the reaction was stopped.

The resulting polyamide prepolymer had a melting point of 149° C., an NH$_2$ concentration of 7.02 equivalents/10$^4$g of polymer, a COOH concentration of 0.62 equivalent/10$^4$g of polymer, and a average molecular weight of 2,617.

Example 6

A polyurethane prepolymer was prepared from tetramethylene glycol (A) and 4,4'-diphenylmethane diisocyanate (D) in the same way as set forth in Example 3.

Separately, 77 g of a polyester prepolymer (OH value 61.7, COOH value 0.5, melting point 170° C.) having an average molecular weight of 1,800 and derived from terephthalic acid (70)/isophthalic acid (30)/ethylene glycol, which was prepared by the method set forth in Example 1, was dissolved in 80 g of anhydrous dimethyl acetamide by heating in an atmosphere of nitrogen, and 0.2 g of dibutyl tin dilaurate was added. The resulting solution held at 120° C. was added to the polyurethane prepolymer obtained above and held at 100° C., and the mixture was stirred. The reaction was performed for 10 minutes at 120° C. Thereafter, 33.3 g of a polyamide prepolymer (C) (NH$_2$ concentration 5.10 equivalents/10$^4$ g of polymer, COOH concentration 0.90 equivalent/10$^4$ g, melting point 164° C.) having an average molecular weight of 3,330 and prepared in the same way as described in Example 4 was dissolved in 55 g of anhydrous dimethyl acetamide by heating at 120° C. in an atmosphere of nitrogen. The reaction was performed for 60 minutes at 130° C. In this Example, the weight ratio (B)+(C)/(A) was 1.61, and the polyamide component accounted for 15 percent by weight of the resulting polyamide urethane urea resin.

Films were prepared from a solution of the resulting polyamide urethane urea resin in dimethyl acetamide, and the strength and elongation of the films were measured. The film was interposed between polyethylene terephthalate knits, and heat bonded at 150° C. for 15 seconds. The peel strength was measured. The following results were obtained.

| | |
|---|---|
| Thickness of the film | 150 microns |
| Break strength of the film | 4.4 kg/cm |
| Break elongation of the film | 500 % |
| Peel strength of polyethylene terephthalate knits bonded to each other | 2.8 kg/cm |
| Peel strength of the above knits after 2-hour immersion in water | 2.5 kg/cm |
| Peel strength of the above knits after 2-hour immersion in perchloroethylene | 1.4 kg/cm |

Example 7

Under quite the same conditions as set forth in Example 5, a polyurethane prepolymer was prepared from polyethylene adipate (A) and xylylene diisocyanate (D).

Separately, 29.8 g of a polyester prepolymer (B) (OH value 65.5, COOH value 0.4, melting point 170° C.) having an average molecular weight of 1,700, which was prepared from terephthalic acid (70)/isophthalic acid (30)/ethylene glycol by the method described in Example 1, and 91 g of a polyamide prepolymer (C) (NH$_2$ concentration 8.20 equivalents/10$^4$ g of polymer, COOH concentration 0.45 equivalent/10$^4$ g of polymer, melting point 147° C.) which was prepared from epsilon-caprolactam, adipic acid, sebacic acid, and hexamethylene diamine by the method described in Example 5, and had an average molecular weight of 2,311 were dissolved in 200 g of anhydrous dimethyl acetamide by heating in an atmosphere of nitrogen. Then, 0.2 g of dibutyl tin laurate was added as a catalyst, and with vigorous stirring at 130° C., the polyurethane prepolymer prepared above was added. The reaction was performed for 60 minutes at 130° to 140° C. Then, 2 g of dicyclohexyl phthalate as a plasticizer was added. In this Example, the weight ratio (B)+(C)/(A) was 1.40, and the weight of the polyamide component in the resulting polyamide urethane urea resin was 41 percent. Films were prepared from a solution of this resin in dimethyl acetamide. The films had the following properties.

| | |
|---|---|
| Thickness of the film | 140 microns |
| Break strength of the film | 4.5 kg/cm |
| Break elongation of the film | 500 % |
| Peel strength of polyethylene terephthalate knits bonded to each other | 2.6 kg/cm |
| Peel strength of the above knits after 2-hour immersion in water | 2.4 kg/cm |
| Peel strength of the above knits after 2-hour immersion in perchloroethylene | 1.5 kg/cm |
| Peel strength of nylon 6 fabrics bonded to each other | 3.0 kg/cm |

The peel strength was measured with respect to the specimen obtained by interposing the film between the knits and heat bonding them at 150° C. for 15 seconds. The polyamide urethane urea resin which contains a large amount of the polyamide prepolymer as in the present Example exhibited a strong affinity for shaped articles of polyamide.

Example 8

A polyamide urethane urea resin was prepared under the same conditions as set forth in Example 7 except that the amount of the polyester prepolymer (B) was changed to 76.5, the amount of the polyamide prepolymer (C) was changed to 11.6 g, and a plasticizer was not added. In this Example, the weight ratio (B)+(C)/(A) was adjusted to 1.03, and the weight of the polyamide component in the resulting resin was 6 percent.

This polyamide urethane urea resin, as shown in the following, has somewhat poor resistance to dry cleaning, but showed especially strong affinity for fabrics of a blend of polyethylene terephthalate fibers and cotton.

| | |
|---|---|
| Thickness of the film | 145 microns |
| Break strength of the film | 3.8 kg/cm |
| Break elongation of the film | 1,300 % |
| Peel strength of fabrics of a blend of polyethylene terephthalate fibers (65)/cotton (35) | 5.2 kg/cm |
| Peel strength of polyethylene terephthalate knits bonded to each other | 3.0 kg/cm |
| Peel strength of the above knits after 2-hour immersion in water | 2.8 kg/cm |
| Peel strength of the above knits after 2-hour immersion in perchloroethylene | 1.0 kg/cm |

Example 9

A polyurethane prepolymer was prepared from polyethylene adipate (A) and xylylene diisocyanate (D) under the same conditions as set forth in Example 5.

Separately, 56.1 g of a polyester prepolymer having an average molecular weight of 1,700 prepared from terephthalic acid (70)/isophthalic acid (25)/adipic acid (5)/ethylene glycol used in Example 1 and 29.8 g of a polyamide prepolymer (C) ($NH_2$ concentration 10.52 equivalents per $10^4$ g of polymer, COOH concentration 0.91 equivalent per $10^4$ g of polymer, melting point 156° C) having an average molecular weight of 1750, which was prepared from epsilon-caprolactam (60)/nylon 6,6 40) by the method described in Example 1 were dissolved in 125 g of anhydrous dimethyl acetamide by heating in an atmosphere of nitrogen. After adding 0.2 g of dibutyl tin dilaurate as a catalyst, the mixture was vigorously stirred at 130° C., and the polyurethane prepolymer prepared above was added. The reaction was performed for 60 minutes at a temperature of 130° to 140°C.

In this Example, the weight ratio (B)+(C)/(A) was adjusted to 1.0, and the weight of the polyamide component in the polyamide urethane urea resin obtained was 15.7 percent.

Films were prepared form a solution of the resulting resin. The physical properties of the films were as follows:

| | |
|---|---|
| Thickness of the film | 140 microns |
| Break strength of the film | 4.1 kg/cm |
| Break elongation of the film | 1,150 % |
| Peel strength of polyethylene terephthalate knits bonded to each other | 2.9 kg/cm |
| Peel strength of the above knits after 2-hour immersion in water | 2.6 kg/cm |
| Peel strength of the above knits after 2-hour immersion in perchloroethylene | 1.8 kg/cm |

Comparative Examples 8 to 12

Comparative Examples 8 to 12

Several adhesives having thermoplasticity were chosen from commercial available adhesives, and films having a thickness of 150 microns were prepared. Adhesive properties of these films on polyethylene terephthalate fabrics were tested, and the following results were obtained.

The thermoplastic polyamide urethane urea resins obtained by the process of the present invention.

The thermoplastic polyamide urethane urea resins of the present invention, as shown in Examples 1 to 9, have far superior properties to those of the commercially available adhesives.

| A. | B. | C. | D. | E. | F. |
|---|---|---|---|---|---|
| 8 | Desmocol 176 | 180 | 1.2 | 0.8 | 0.2 |
| 9 | Paraprene 22S | 190 | 1.8 | 1.4 | 0.8 |
| 10 | Erbax 150 | 130 | 2.0 | 1.6 | 0.3 |
| 11 | Ester Resin No. 30 | 120 | 2.2 | 1.8 | 0.2 |
| 12 | CM 4000 | 175 | 1.5 | 0.7 | 1.3 |

A. – Comparative Example
B. – Tradenames of adhesives
C, – Bonding temperature (°C.)
D. – Peel strength of polyethylene terephthalate fabrics
F. – Peel strength of the above knits after 2 hour immersion (kg/cm)
E. – Peel strength of the above knits after 2-hour immersion (kg/cm)

"Desmocol 176" is a tradename for a polyurethane type adhesive produced by Bayer,; "Paraprene 22S" is a polyurethane type adhesive produced by Nippon Polyurethane Company; "Erbax 150" is an ethylene/vinyl acetate adhesive produced by Du Pont; "Ester Resin No. 30" is a polyester type adhesive produced by Toyo Spinning Co., Ltd.; and "CM 4000" is a copolyamide type adhesive produced by Toray Industries, Inc.

Example 10

Polyethylene adipate (A) (67.5 g) having a average molecular weight of 1,350 was heated to 100° C., and dehydrated and dried for 30 minutes at a reduced pressure of 3 mm Hg. Thereafter, the temperature was maintained at 100° C. in an atmosphere of nitrogen, and 18.8 g of xylylene diisocyanate (meta/para=80/20) (D) was added. The reaction was performed with stirring for 60 minutes at 100° C. to form a polyurethane prepolymer.

Separately, 66.3 g of a polyester prepolymer (B) (OH value 65.6, COOH value 0.3, melting point 64° to 68° C.) having an average molecular weight of 1,700 and prepared by the process described in Example 1 from terephthalic acid (65)/isophthalic acid (35)/ethylene glycol and 27.3 g of a polyamide prepolymer (C) having an average molecular weight of 1,820 and prepared from epsilon-caprolactam, adipic acid, and hexamethylene diamine by the method to be described below were dissolved in 125 g of anhydrous dimethyl acetamide by heating in an atmosphere of nitrogen. After adding 0.2 g of dibutyl tin dilaurate as a catalyst, the polyurethane prepolymer prepared above was added, and the reaction was performed at 130° C. for 60 minutes. In this Example, the (D)/(A)+(B)+(C) mole ratio was adjusted to 0.96, and the weight ratio (B)+(C)/(A), to 1.39, and the weight of the polyamide component in the resulting polyamide urethane resin was 15 percent.

Films were prepared from a solution of the resulting polyamide urethane urea resin in dimethyl acetamide, and the strength and elongation of the films were measured. The film was interposed between knits, and heat bonded for 15 minutes at 137° C. The peel strength was then measured. The results were as follows:

| | |
|---|---|
| Thickness of the film | 140 microns |
| Break strength of the film | 3.9 kg/cm |
| Break elongation of the film | 900 % |
| Peel strength of polyethylene terephthalate knits bonded to each other | 3.9 kg/cm |
| Peel strength of the above knits after 2-hour immersion in water | 3.0 kg/cm |
| Peel strength of the above knits after 2-hour immersion in perchloroethylene | 1.7 kg/cm |

The polyamide prepolymer used in this Example was prepared by the following method.

Epsilon-caprolactam (2,160 g), 803 g of adipic acid, 902 g of hexamethylene diamine, and 930 g of ion-exchange water were mixed and heated in an atmosphere of nitrogen. At about 95° C., a homogeneous solution resulted. At this time, 0.07 g of $MnCl_2 \cdot 4H_2O$ and 0.05 g of $CuCl_2 \cdot 2H_2O$ were added, and the temperature raising was continued. At about 110° C., water began to distill off, and the reaction mixture was further heated to 195° C. in about 120 minutes. The reaction was continued at this temperature for 120 minutes. Then, the pressure was gradually reduced, and the reaction was performed for 30 minutes at 5 mm Hg, and then the reaction was stopped.

The polyamide prepolymer (C) so obtained had a melting point of 155° C., an $NH_2$ concentration of 10.73 equivalents/$10^4$ g of polymer, a COOH concentration of 0.24 equivalent/$10^4$ g of polymer, and an average molecular weight of 1,820.

Example 11

A polyurethane prepolymer was prepared by the same method with that described in Example 10 from 55 g of polyethylene adipate (A) having an average molecular weight of 1,000 and 18.8 g of xylylene diisocyanate (meta/para=80/20) (D).

Separately, 68.4 g of a polyester prepolymer (B) (OH value 61.6, COOH value 0.6, melting point 70°–75° C.) having an average molecular weight of 1,800 and prepared from terephthalic acid (50)/ isophthalic acid (50)/ethylene glycol by the method described in Example 1, and 21.8 g of a polyamide prepolymer (C) having an average molecular weight of 1,820 and used in Example 10 were dissolved in 120 g of anhydrous dimethyl acetamide by heating in an atmosphere of nitrogen. After adding 0.2 g of dibutyl tin dilaurate as a catalyst, the polyurethane prepolymer prepared above was added, and the reaction was performed for 60 minutes at 130° C. In this Example, the mole ratio (D)/(A)+(B)+(C) was adjusted to 0.95, and the weight ratio (B)+(C)/(A), to 1.6. The weight of the polyamide component in the polyamide urethane urea resin was 13.3 percent.

Films were prepared from a solution of the resulting polyamide urethane urea resin in dimethyl acetamide, and the strength and elongation of the films were measured. The film was interposed between knits, and heat bonded for 15 seconds at 139° C. The peel strength was measured. The results were as follows:

| | |
|---|---|
| Thickness of the film | 150 microns |
| Break strength of the film | 3.5 kg/cm |
| Break elongation of the film | 600 % |
| Peel strength of polyethylene terephthalate knits bonded to each other | 3.3 kg/cm |
| Peel strength of the above knits after 2-hour immersion in water | 3.3 kg/cm |
| Peel strength of the above knits after 2-hour immersion in perchloroethylene | 1.4 kg/cm |

Example 12

A polyurethane prepolymer was prepared in the same way as set forth in Example 10 from 60.2 g of polybutylene adipate (A) having an average molecular weight of 1,204 and 18.8 g of xylylene diisocyanate (meta/para=80/20) (D).

Separately, 66.3 g of a polyester prepolymer (B) (OH value 65.3, COOH value 0.6, melting point 97°–100° C.) having an average molecular weight of 1,700 and prepared from terephthalic acid (67)/a 60:40 mixture of 2-methylterephthalic acid and 2-methylisophthalic acid (33)/ethylene glycol by the method described in Example 1, and 22.6 g of a polyamide prepolymer (C) ($NH_2$ concentration 12.01 equivalents/$10^4$ g of polymer, COOH concentration 0.38 equivalent/$10^4$ g of polymer) having an average molecular weight of 1,615 and prepared from epsilon-caprolactam, adipic acid, sebacic acid, and hexamethylene diamine by the method described in Example 5 were dissolved in 120 g of anhydrous dimethyl acetamide by heating in an atmosphere of nitrogen. After adding 0.2 g of dibutyl tin dilaurate as a catalyst, the polyurethane prepolymer obtained above was added, and the reaction was performed for 60 minutes at 135° C.

In this Example, the mole ratio (D)/(A)+(B)+(C) was adjusted to 0.97, and the weight ratio (B)+(C)/(A), to 1.48. The weight of the polyamide component in the resulting polyamide urethane urea resin was 13.5 percent.

Films were prepared from a solution of the resulting resin in dimethyl acetamide, and the strength and elongation of the films were measured. The film was interposed between knits, and heat bonded at 140° C. for 15 seconds. The results were as follows:

| | |
|---|---|
| Thickness of the film | 150 microns |
| Break strength of the film | 3.2 kg/cm |
| Break elongation of the film | 800 % |
| Peel strength of polyethylene terephthalate knits bonded to each other | 3.1 kg/cm |
| Peel strength of the above knits after 2-hour immersion in water | 3.0 kg/cm |
| Peel strength of the above knits after 2-hour immersion in perchloroethylene | 1.5 kg/cm |

Example 13

A polyurethane prepolymer was prepared from 54 g of polyethylene adipate (A) having an average molecular weight of 1,000 and 25 g of 4,4'-diphenylmethane diisocyanate (D) by the same method as used in Example 10.

Separately, 57 g of a polyester prepolymer (B) (OH value 74.4, COOH value 0.4, melting point 59°–64° C.) having an average molecular weight of 1,500 and prepared from terephthalic acid (60)/isophthalic acid (40)/ethylene glycol by the method described in Example 1, and 20.3 g of a polyamide prepolymer (C) having an average molecular weight of 1,692 and prepared from epsilon-caprolactam, sebacic acid, and hexamethylene diamine by the method to be described below were dissolved in 120 g of anhydrous dimethyl acetamide by heating in an atmosphere of nitrogen. After adding 0.2 g of dibutyl tin dilaurate as a catalyst, the polyurethane performed obtained above was added, and the reaction was preformed for 60 minutes at 130° C.

In this Example, the mole ratio (D)/(A)+(B)+(C) was adjusted to 0.96, and the weight ratio (B)+(C)/(A), to 1.43. The weight of the polyamide component in the resulting polyamide urethane urea resin was 13 percent.

Films were prepared from a solution of the resulting resin in dimethyl acetamide, and the strength and elongation of the films were measured. The film was interposed between knits, and heat bonded at 137° C. for 15 seconds. The peel strength was measured. The results were as follows:

| | |
|---|---|
| Thickness of the film | 150 microns |
| Break strength of the film | 3.0 kg/cm |
| Break elongation of the film | 1,000 % |
| Peel strength of polyethylene terephthalate knits bonded to each other | 3.1 kg/cm |
| Peel strength of the above knits after 2-hour immersion in water | 3.0 kg/cm |

| Peel strength of the above knits after 2-hour immersion in perchloroethylene | 1.5 kg/cm |
|---|---|

The polyamide prepolymer used in this Example was prepared as follows:

Epsilon-caprolactam (1,200 g), 1,143 g of sebacic acid, 908 g of hexamethylene diamine, and 1,393 g of ion exchange water were added, followed by further addition of 0.07 g of $MnCl_2 \cdot 4H_2O$ and 0.05 g of $CuCl_2 \cdot 2HB20$. The mixture was stirred by heating in an atmosphere of nitrogen. At about 95° C., a homogeneous solution resulted. At about 110° C., water began to distill off. The heating was further continued, and the temperature rose to 195° C. in about 120 minutes. The reaction was continued at this temperature for 120 minutes. Then, the pressure was gradually reduced, and the reaction was performed for 30 minutes at 5 mm Hg, and then the reaction was stopped.

The polyamide prepolymer so obtained had a melting point of 144° C., an $NH_2$ concentration of 11.53 equivalent/$10^4$ g of polymer, a COOH concentration of 0.29 equivalent/$10^4$ g of polymer, and an average molecular weight of 1,692.

Example 14

A polyurethane prepolymer was prepared from polyethylene propylene adipate (EG/PG=70/30) (A) having an average molecular weight of 1,650 and 18.8 g of xylylene diisocyanate by the same method as described in Example 10.

Separately, 66.3 g of a polyester prepolymer (B) having an average molecular weight of 1,700 and prepared from terephthalic acid (65)/isophthalic acid (35)/ethylene glycol and 27 g of a polyamide prepolymer (C) having an average molecular weight of 1,800 and prepared by the method to be described from epsilon-caprolactam, laurolactam, adipic acid, and hexamethylene diamine were dissolved in 130 g of anhydrous dimethyl acetamide by heating in an atmosphere of nitrogen. After adding 0.2 g of dibutyl tin dilaurate as a catalyst, the polyurethane prepolymer obtained above was added, and the reaction was performed for 60 minutes at 135° C.

In this Example, the mole ratio (D)/(A)+(B)+(C) was adjusted to 0.96, and the weight ratio (B)+(C)/(A), to 1.13. The weight of the polyamide component in the resulting polyamide urethane urea resin was 13.9 percent.

Films were prepared from a solution of the polyamide urethane urea resin obtained, and the strength and elongation of the films were measured. The film was interposed between knits, and heat-bonded at 132° C. for 15 seconds. The Peel strength was measured. The results were as follows:

| | |
|---|---|
| Thickness of the film | 150 microns |
| Break strength of the film | 3.0 kg/cm |
| Break elongation of the film | 1,200 % |
| Peel strength of polyethylene terephthalate knits bonded to each other | 2.8 kg/cm |
| Peel strength of the above knits after 2-hour immersion in water | 2.8 kg/cm |
| Peel strength of the above knits after 2-hour immersion in perchloroethylene | 1.3 kg/cm |

The polyamide prepolymer (C) used in this Example was prepared by the following method.

Epsilon-caprolactam (900 g), 1,050 g of omega-laurinlactam, 585 of adipic acid, 678 g of hexamethylene diamine, and 750 g of ion exchange water were added, followed by the addition of 0.05 g of $MnCl_2 \cdot 4H_2O$, and 0.04 g of $CuCl_2 \cdot 2H_2O$. The mixture was heated with stirring in an atmosphere of nitrogen. At about 110° C., water began to distill off. Heating was continued, and the temperature rose to 195° C. in about 120 minutes. The reaction was continued at this temperature for 120 minutes. Then the pressure was gradually reduced, and the reaction was performed for 30 minutes at 5 mm Hg, and then the reaction was stopped.

The polyamide prepolymer so obtained had a melting point of 135° C., an $NH_2$ concentration of 10.81 equivalents/$10^4$ g of polymer, a COOH concentration of 0.30 equivalent/$10^4$ g of polymer, and a molecular weight of 1,800.

Example 15

A polyurethane prepolymer was prepared from 62.5 g of polyethylene adipate (A) having an average molecular weight of 1,250 and 22.2 g of isophorone diisocyanate (D) by the method described in Example 10.

Separately, 66.3 g of a polyester prepolymer (B) having an average molecular weight of 1,700 and used in Example 10 and 27.3 g of a polyamide prepolymer (C) having an average molecular weight of 1,820 and used in Example 10 were dissolved in 125 g of anhydrous dimethyl acetamide by heating in an atmosphere of nitrogen. After adding 0.2 g of dibutyl tin dilaurate as a catalyst, the polyurethane prepolymer obtained above was added, and the reaction was performed for 60 minutes at 130° C.

In this Example, the mole ratio (D)/(A)+(B)+(C) was adjusted to 0.96, and the weight ratio (B)+(C)/(A), to 1.50. The weight of the polyamide component in the resulting polyamide urethane urea resin was 15.1 percent.

Films were prepared from a solution of the resulting resin, and the strength and elongation of the films were measured. The film was interposed between knits, and heat-bonded at 139° C. for 15 seconds.

The peel strength was measured, and the following results were obtained.

| | |
|---|---|
| Thickness of the film | 140 microns |
| Break strength of the film | 3.0 kg/cm |
| Break elongation of the film | 750 % |
| Peel strength of polyethylene terephthalate knits bonded to each other | 3.0 kg/cm |
| Peel strength of the above knits after 2-hour immersion in water | 2.9 kg/cm |
| Peel strength of the above knits after 2-hour immersion in perchloroethylene | 1.6 kg/cm |

Example 16

The procedure of Example 15 was followed except that 21 g of trimethylhexamethylene diisocyanate was used instead of 22.2 g of isophorone diisocyanate. Films were prepared from a solution of the resulting polyamide urethane urea resin, and the strength and elongation of the films were measured. The film was interposed between knits, and heat-bonded at 139° C. for 15 seconds. The peel strength was measured. The results were as follows:

| | |
|---|---|
| Thickness of the film | 150 microns |
| Break strength of the film | 3.5 kg/cm |
| Break elongation of the film | 800 % |

| | |
|---|---|
| Peel strength of polyethylene terephthalate knits bonded to each other | 3.5 kg/cm |
| Peel strength of the above knits after 2-hour immersion in water | 3.3 kg/cm |
| Peel strength of the above knits after 2-hour immersion in perchloroethylene | 1.7 kg/cm |

Example 17

The procedure of Example 15 was followed except that 21 g of naphthalene-1,5-diisocyanate was used instead of 22.2 g of isophorone diisocyanate. Films were prepared from a solution of the resulting polyamide urethane urea resin, and the strength and elongation of the films were measured. The film was interposed between knits, and heat bonded at 139° C. for 15 seconds. The peel strength was measured. The results were as follows:

| | |
|---|---|
| Thickness of the film | 150 microns |
| Break strength of the film | 3.8 kg/cm |
| Break elongation of the film | 750 % |
| Peel strength of polyethylene terephthalate knits bonded to each other | 3.6 kg/cm |
| Peel strength of the above knits after 2-hour immersion in water | 3.5 kg/cm |
| Peel strength of the above knits after 2-hour immersion in perchloroethylene | 1.7 kg/cm |

Example 18

The procedure of Example 15 was followed except that 16.8 g of hexamethylene diisocyanate was used instead of 22.2 g of isophorone diisocyanate. Films were prepared from a solution of the resulting polyamide urethane urea resin, and the strength and elongation were measured. The film was interposed between knits, and heat-bonded at 138° C. for 15 seconds. The peel strength was measured. The results were as follows:

| | |
|---|---|
| Thickness of the film | 150 microns |
| Break strength of the film | 3.6 kg/cm |
| Break elongation of the film | 850 % |
| Peel strength of polyethylene terephthalate knits bonded to each other | 3.7 kg/cm |
| Peel strength of the above knits after 2-hour immersion in water | 3.5 kg/cm |
| Peel strength of the above knits after 2-hour immersion in perchloroethylene | 1.5 kg/cm |

What we claim is:

1. A thermoplastic polyamide urethane urea resin which is the reaction product of
    A. a linear polyhydroxyl prepolymer having a hydroxyl group at both terminals and being free from ethylene terephthalate chains, said linear poly-hydroxyl prepolymer having an average molecular weight of 400 to 4,000 and is liquid at 80° C.,
    B. a linear polyester prepolymer having a hydroxyl group at both terminals, said linear polyester prepolymer having a molecular weight of 400 to 3,000 and a melting point of 50° to 220° C. and 35 to 95 by weight of the molecular chain of said linear polyester prepolymer consisting of ethylene terephthalate units,
    C. a linear polyamide prepolymer having an average molecular weight of 400 to 4,000 and a melting point of 100° to 200° C., at least 80% of the terminal groups of said linear polyamide prepolymer being amino groups, and
    D. an organic diisocyanate;
the composition of the reaction components (A), (B), (C) and (D) being as follows:
    i. (D)/(A) + (B) + (C) (mole ratio) < 1
    ii. (B) + (C)/(A) (weight ratio) = 0.5 − 2
    iii. (C)/(B) + (C) (weight ratio) = 0.06 − 0.85
    iv. (C)/(A) + (B) + (C) + (D) (weight %) = 3 − 55.

2. A thermoplastic polyamide urethane urea resin which is the reaction product of
    A. a linear polyhydroxyl prepolymer having a hydroxyl group at both terminals and being free from ethylene terephthalate chains, said linear polyhydroxyl prepolymer having an average molecular weight of 800 to 3,000 and is liquid at 60° D.,
    B. a linear polyester prepolymer having a hydroxyl group at both terminals, said linear polyester prepolymer having an average molecular weight of 1,000 to 2,500 and a melting point of 50° to 200° C., 35 to 95% by weight of the molecular chain of said linear polyester prepolymer consisting of ethylene terephthalate units,
    C. a linear polyamide prepolymer having an average molecular weight of 800 to 3,500 and a melting point of 120° to 180° C., at least 80 percent of the terminal groups of said linear polyamide prepolymer being amino groups, and
    D. an organic diisocyanate;
the composition of the reaction components (A), (B), (C) and (D) being as follows:
    i. (D)/(A) + (B) + (C)(mole ratio) < 1
    ii. (B) + (C)/(A) (weight ratio) = 0.5 − 2
    iii. (C)/(B) + (C) (weight ratio) = 0.06 − 0.85
    iv. (C)/(A) + (B) + (C) + (D) (weight %) = 3 − 55.

3. The thermoplastic polyamide urethane urea resin of claim 2 wherein the composition of the reaction components (A), (B), (C) and (D) is as follows:
    i. (D)/(A) + (B) + (C) (mole ratio) = 0.8 − 0.98
    ii. (B) + (C)/(A)(weight ratio) = 0.8 − 1.7
    iii. (C)/(B) + (C) (weight ratio) = 0.1 − 0.76
    iv. (C)/(A) + (B) + (C)+ (D) (weight %) = 5 − 45.

4. A thermoplastic polyamide urethane urea resin which is the reaction product of
    A. a linear aliphatic polyhydroxyl prepolymer having a hydroxyl group at both terminals and being free from ethylene terephthalate chains, said linear aliphatic polyhydroxyl prepolymer having an average molecular weight of 400 to 4,000 and is liquid at a temperature of 60° C. or below,
    B. a linear polyester prepolymer having a hydroxyl group at both terminals, said linear polyester prepolymer having an average molecular weight of 1,000 to 3,000 and a melting point of 50° to 100° C., 35 percent by weight to less than 70 % by weight of the molecular chain of said linear polyester prepolymer consisting of ethylene terephthalate units,
    C. a linear polyamide prepolymer which has an average molecular weight of 400 to 4,000 and a melting point of 100° to 180° C., at least 80 percent of the terminals groups of said linear polyamide prepolymer being amino groups, and
    D. an organic diisocyanate;
the composition of the reaction components (A), (B), (C) and (D) being as follows:

i. (D)/(A) + (B) + (C) (mole ratio) < 1
   ii. (B) + (C)/(A) (weight ratio) = 0.5 − 2.0
   iii. (C)/(B) + (C) (weight ratio) = 0.15 − 0.60
   iv. (C)/(A) + (B) + (C) + (D) (weight %) = 7 − 40.

5. A thermoplastic polyamide urethane urea resin which is the reaction product of
   A. a linear aliphatic polyhydroxyl prepolymer having a hydroxyl prepolymer at both terminals and being free from ethylene terephthalate chains, said linear aliphatic polyhydroxyl prepolymer having an average molecular weight of 800 to 3,000 and is liquid at a temperature of 50° C. or below,
   B. a linear polyester prepolymer having a hydroxyl group at both terminals, said linear polyester prepolymer having an average molecular weight of 1,000 to 2,500 and a melting point of 55° to 100° C., 50 percent by weight to less than 70 % by weight of the molecular chain of said linear polyester prepolymer consisting of ethylene terephthalate units,
   C. a linear polyamide prepolymer having an average molecular weight of 800 to 3,500 and a melting point of 120° to 170° C., at least 80 percent of the terminal groups of said linear polyamide prepolymer being amino groups, and
   D. an organic diisocyanate;
the composition of the reaction components (A), (B), (C) and (D) being as follows:
   i. (D)/(A) + (B) + (C) (mole ratio) = 0.80 − 0.98
   ii. (B) + (C)/(A) (weight ratio) = 1.0 − 1.8
   iii. (C)/(B) + (C) (weight ratio) = 0.20 − 0.40
   iv. (C)/(A) + (B) + (C) + (D) (weight %) = 10 − 25.

6. A thermoplastic polyamide urethane urea resin which is the reaction product of
   A. a linear aliphatic polyhydroxyl prepolymer having a hydroxyl group at both terminals and being free from ethylene terephthalate chains, said linear aliphatic polyhydroxyl prepolymer having an average molecular weight of 800 to 2,500 and is liquid at a temperature of 50° C. or below,
   B. a linear polyester prepolymer having a hydroxyl group at both terminals, said linear polyester prepolymer having an average molecular weight of 1,300 to 2,300 and a melting point of 55° to 85° C. 55 % by weight to less than 70 % by weight of the molecular chain of said linear polyester prepolymer consisting of ethylene terephthalate units,
   C. a linear binary to quaternary copolyamide prepolymer which has an average molecular weight of 800 to 3,500 and a melting point of 120° to 170° C. at least 80 percent of the terminal groups of said linear binary to quaternary copolyamide prepolymer being amino groups, said prepolymer being prepared from at least two components selected from a $C_6$—$C_{12}$ lactam, a $C_6$—$C_{12}$ omega-amino acid, a $C_6$—$C_{12}$ dicarboxylic acid and a $C_6$—$C_{12}$ diamine, and
   (D) an organic diisocyanate;
the composition of the reaction components (A), (B), (C) and (D) being as follows:
   i. (D)/(A) + (B) + (C) (mole ratio) = 0.80 − 0.98
   ii. (B) + (C)/(A) (weight ratio) = 1.2 − 1.8
   iii. (C)/(B) + (C) (weight ratio) = 0.25 − 0.35
   iv. (C)/(A) + (B) + (C) + (D) (weight %) = 12 − 20.

7. A thermoplastic polyamide urethane urea which is the reaction product of
   A. a linear polyhydroxyl prepolymer having a hydroxyl group at both terminals and being free from ethylene terephthalate chains, said linear polyhydroxyl prepolymer having an average molecular weight of 400 to 4,000 and is liquid at 80° C. or below,
   B. a linear polyester prepolymer having a hydroxyl group at both terminals, said linear polyester prepolymer having an average molecular weight of 400 to 3,000 and a melting point of about 100° but not higher than 200° C., a major portion of the molecular chain of said linear polyester prepolymer consisting of ethylene terephthalate units,
   C. a linear polyamide prepolymer which has an average molecular weight of 400 to 4,000 and a melting point of 100° to 200° C., at least 80 percent of the terminal groups of said linear polyamide prepolymer being amino groups, and
   D. an organic diisocyanate;
the composition of the reaction components (A), (B), (C) and (D) being as follows:
   i. (D)/(A) + (B) + (C) (mole ratio) < 1
   ii. (B) + (C)/(A) (weight ratio) = 0.5 − 2.0
   iii. (C)/(B) + (C) (weight ratio) = 0.06 − 0.85
   iv. (C)/(A) + (B) + (C) + (D) (weight %) = 3 − 55.

8. A thermoplastic polyamide urethane urea resin which is the reaction product of
   A. a linear aliphatic polyester prepolymer having a hydroxyl group at both terminals, and being free from ethylene terephthalate chains said linear aliphatic polyester prepolymer having an average molecular weight of 400 to 4,000 and is liquid at 80° C. or below,
   B. a linear polyester prepolymer having a hydroxyl group at both terminals, said linear polyester prepolymer having an average molecular weight of 400 to 3,000 and a melting point of above 100° C. but not higher than 220° C. 70 to 95 percent by weight of the molecular chain of said linear polyester prepolymer consisting of ethylene terephthalate units,
   C. a linear polyamide prepolymer which has an average molecular weight of 400 to 4,000 and a melting point of 100° to 200° C., at least 80 percent of the terminal groups of said linear polyamide prepolymer being amino groups, and
   D. an organic diisocyanate;
the composition of the reaction components (A), (B), (C) and (D) being as follows:
   i. (D)/(A) + (B) + (C) (mole ratio) = 0.80 − 0.98
   ii. (B) + (C)/(A) (weight ratio) = 0.8 − 1.7
   iii. (D)/(B) + (C) (weight ratio) = 0.10 − 0.76
   iv. (C)/(A) + (B) + (C) + (D) (weight %) = 5 − 45.

9. The thermoplastic polyamide urethane urea resin of claim 8 which is the reaction product of
   A. a linear aliphatic polyester prepolymer having a hydroxyl group at both terminals and being free from ethylene terephthalate chains, said linear aliphatic polyester prepolymer having an average molecular weight of 800 to 3,000 and is liquid at 60° C. or less, B. a linear polyester prepolymer having a hydroxyl group at both terminals, said linear polyester prepolymer having an average molecular weight of 1,000 to 2,500 and a melting point of 130° to 200° C., 70 to 95 percent by weight of the molecular chain of said linear polyester prepolymer consisting of ethylene terephthalate units, C. a linear polyamide prepolymer having an average molecular weight of 800 to 3,500 and a melting point of 130° to 180° C., at least 80 percent of the terminal groups of said linear polyamide prepolymer being amino groups, and D. an organic diisocyanate.

10. The thermoplastic polyamide urethane urea resin of claim 9 wherein said linear polyamide prepolymer is a binary to quaternary copolyamide prepolymer prepared from at least two components selected from a $C_6$—$C_{12}$ lactam, a $C_6$—$C_{12}$ omega-amino acid, a $C_6$—$C_{12}$ dicarboxylic acid, and a $C_6$—$C_{12}$ diamine.

* * * * *